(12) United States Patent
Heimel et al.

(10) Patent No.: US 8,282,089 B2
(45) Date of Patent: Oct. 9, 2012

(54) VACUUM TRANSPORT DEVICE WITH MOVABLE GUIDE RAIL

(75) Inventors: Oliver Heimel, Wabern (DE); Andreas Jischke, Kahl (DE); Dieter Haas, Bruchkoebel (DE)

(73) Assignee: Applied Materials GmbH & Co. KG, Alzenau (DE)

( * ) Notice: Subject to any disclaimer, the term of this patent is extended or adjusted under 35 U.S.C. 154(b) by 1353 days.

(21) Appl. No.: 11/709,929

(22) Filed: Feb. 21, 2007

(65) Prior Publication Data
US 2007/0231111 A1 Oct. 4, 2007

(30) Foreign Application Priority Data
Mar. 29, 2006 (EP) .................................. 06111908

(51) Int. Cl.
*B23P 17/04* (2006.01)
(52) U.S. Cl. ............................................. 269/21; 269/8
(58) Field of Classification Search .................. 269/21, 269/20, 298 R, 8; 414/217
See application file for complete search history.

(56) References Cited

U.S. PATENT DOCUMENTS

| | | | |
|---|---|---|---|
| 642,206 A | 1/1900 | Chambers et al. | |
| 3,347,655 A | 10/1967 | Babcock et al. | |
| 4,023,691 A * | 5/1977 | Perel | 414/810 |
| 4,409,860 A * | 10/1983 | Moriyama et al. | 74/490.09 |
| 4,682,766 A * | 7/1987 | Barkley | 269/71 |
| 4,766,465 A * | 8/1988 | Takahashi | 355/53 |
| 4,896,869 A * | 1/1990 | Takekoshi | 269/60 |
| 5,170,714 A | 12/1992 | Katagiri | |
| 5,533,243 A * | 7/1996 | Asano | 29/25.01 |
| 5,727,434 A * | 3/1998 | Dils et al. | 83/169 |
| 5,909,995 A | 6/1999 | Wolf et al. | |
| 6,184,972 B1 * | 2/2001 | Mizutani et al. | 355/72 |
| 6,264,187 B1 * | 7/2001 | Hertz et al. | 269/266 |
| 6,432,206 B1 | 8/2002 | Tolt | |
| 6,511,574 B2 * | 1/2003 | Barringer et al. | 156/295 |
| 6,863,735 B1 | 3/2005 | Nakahara et al. | |
| 2007/0231111 A1 * | 10/2007 | Heimel et al. | 414/217 |

FOREIGN PATENT DOCUMENTS

| | | |
|---|---|---|
| DE | 295 14 989 | 11/1995 |
| JP | 02-052829 A | 2/1990 |
| JP | 10120171 A | 5/1998 |
| JP | 2002364644 A | 12/2002 |
| JP | 2006021194 A | 1/2006 |
| KR | 20060011586 A | 2/2006 |
| TW | 373627 U | 11/1999 |
| TW | 477349 Y | 2/2002 |

* cited by examiner

*Primary Examiner* — Lee D Wilson
(74) *Attorney, Agent, or Firm* — Kilpatrick Townsend & Stockton LLP (57) ABSTRACT

The present invention concerns a device for transporting substrates through vacuum chambers, especially coating machines with a substrate carrier on or at which the substrates can be arranged, wherein the substrate carrier has at least one guide rail which extends along at least one side of the substrate carrier, and wherein the guide rail is kept spaced apart from the substrate carrier by one or just a few spaced bearings.

22 Claims, 13 Drawing Sheets

VACUUM TRANSPORT DEVICE WITH MOVABLE GUIDE RAIL

PRIORITY

This application claims priority under 35 U.S.C. §119(a) to EP 06111908.7, filed Mar. 29, 2006, the entire disclosure of which is incorporated herein by reference for all purposes.

BACKGROUND OF THE INVENTION

1. Field of the Invention

The present invention refers to a device for the transport of substrates through vacuum chambers, especially coating machines with a substrate carrier, on or at which the substrate may be arranged, wherein the substrate carrier has at least one guide rail which extends along at least one side of the substrate carrier.

2. Prior Art

From CH 691 680 A5 and DE 297 15 535 U1 is known a transport device for work pieces in a vacuum machine in which the substrate carriers may be arranged for, especially, flat and large-surface substrates, such as glass panes on a corresponding plate-like, disk-like or frame-like substrate carrier, with the substrate carrier having permanent magnets at its upper side that interact with a magnetically soft U-shaped holder, which is also fitted with magnets, such that the substrate carrier is transported at its upper side without contact. Disclosure of the aforementioned documents is fully incorporated into the present disclosure by way of reference.

Although this solution already yields very good results, the arrangement of the magnetic rail at the residual substrate carrier, for example a carrier plate or a frame arrangement, leads to the problem that, in the case of large-surface substrates having a substrate carrier of certain dimensions, due to the differential heating of the parts, namely magnet guide rail on one hand and carrier on the other, especially in the case of cyclical repetitive heating, which is often the case in coating machines, the parts of the substrate carrier rub against each other. Moreover, through the stresses and strains of the large-surface substrates or substrate carriers during transport, undefined deformation is introduced, such as torsion of the whole carrier, bending of the plates etc, which can lead to further relative movement of the magnet guide rail and the substrate carrier on one hand and, on the other, to frictional contact with and grinding or bumping at the magnetic holder in which the substrate carrier with its magnet guide rail is normally guided in the machine without contact, such that, in some circumstances, not unsubstantial wear may be generated that can disadvantageously impact on the quality of the coatings performed therein.

BRIEF SUMMARY OF THE INVENTION

Technical Object

It is therefore the object of the present invention to remedy this problem and especially to achieve a reduction of contamination of a vacuum chamber by guiding the substrate carrier at its upper side. At the same time, the solution to be provided should be simple to realize and be reliable and cost efficient in use.

Technical Solution

This object is achieved with a device having the features of claim 1. Advantageous embodiments are the object of the dependent claims.

In accordance with the present invention, the above object is achieved by arranging the guide rail at the substrate carrier such that it is held by one or several bearings spaced apart from the substrate carrier, such that, in the event of differential deformation of guide rail and the rest of the substrate carrier as a consequence of temperature and process influences, no mutual frictional surfaces or only slight or defined frictional surfaces are present, such that abrasion may be reduced or prevented. Additionally such a solution offers the possibility of allowing twisting or deformation or general movement of the substrate carrier, while, at the same time, the guide rail in the magnetic holder of the transport system may be moved un-deformed, such that no collisions occur between the substrate carrier or the guide rail and the other machine parts, especially no grinding of the guide rail at the counter rail in the magnetic transport or holding system. In this way, abrasion can also be substantially reduced or totally prevented. Moreover, this enables production inaccuracies to be compensated or larger production tolerances to be allowed.

In preferably flat, plate-like, disk-like and/or frame-like substrate carriers, on or at which large-surface, flat substrates, especially large-surface glass substrates, such as for display production or architectural glazing, may be arranged, the guide rail is preferably arranged along one longitudinal side of the substrate carrier in the longitudinal direction, with its being advantageous here to mount the guide rail in a central area at the substrate carrier, preferably via a single, central bearing. This has the advantage that no additional bearing movements need to be feared or taken into account.

In the arrangement of the central bearing, the arrangement region about the central axis of symmetry can be chosen in a wide range to suit the other requirements. A large central arrangement is, however, advantageous, as it facilitates uniform, symmetrical mounting of the guide rail.

The central bearing may be a fixed or movable bearing, especially a pivot bearing.

In the case of a fixed bearing, a stiff and rigid connection is made between guide rail and the rest of the substrate carrier, with differential movement or deformation of guide rail and the rest of the substrate carrier essentially executed or dissipated in these components. It has proved advantageous in this regard if especially the substrate carrier part, especially a corresponding frame part, connected to the fixed bearing is made from an elastic material in order that the differential deformation there may be facilitated. It has especially proven advantageous to provide a "soft", thin metallic plate, such as an aluminum plate, with a thickness of approx 12 mm, which acts like a leaf spring.

Alternatively, the central bearing may also be a movable bearing, especially a pivot bearing, which facilitates a certain movement of guide rail relative to the rest of the substrate carrier by virtue of its bearing properties. Such a movable bearing may preferably be a pivot bearing whose rotation axis is in the plane of the substrate carrier and/or is essentially aligned perpendicularly to the side, especially the upper side, of the substrate carrier. Thus, the ends of the guide rail may be rotated relative to the ends of the rest of the substrate carrier or the substrate carrier plate.

Such a pivot bearing may preferably be made from a plastic material especially in the form of PEEK bearing blocks with a stainless steel shaft as the rotation axis.

Preferably, the central bearing may be the sole bearing. Admittedly, given corresponding dimensions of the substrate carrier, one or more side bearings, especially in the form of movable bearings, may be necessary.

Preferably, such a side movable bearing is formed as a ball or roller bearing, which facilitates movement of the ends of the guide rail perpendicularly to the substrate carrier plane, i.e. the rotation axis is aligned parallel with the longitudinal side of the substrate carrier.

Preferably, a device for limiting rotation or movement is provided between guide rail and substrate carrier, said device facilitating limitation of mutual movement of guide rail and substrate carrier towards each other. In this way, excessive movement or deformation of the individual parts is prevented from leading to collisions during transport of the substrate carrier in the vacuum machine.

A corresponding rotation or movement limiter may be designed as a separate part or be integrated into a corresponding bearing, especially side movable bearings.

BRIEF DESCRIPTION OF THE FIGURES

Further advantages, characteristics and features of the present invention are apparent from the following detailed description of preferred embodiments. The drawings show in purely schematic form in FIG. 1 a partial side view of a first substrate carrier.

DETAILED DESCRIPTION OF THE INVENTION

Figure 1:
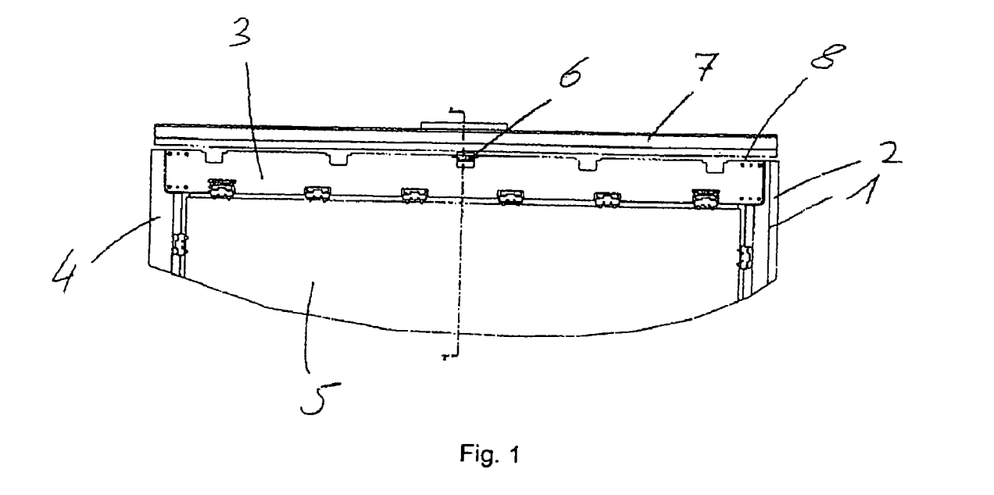

FIG. 1 shows a partial side view of a substrate carrier 1 in accordance with the invention that is assembled from several frame parts 2 to 4 and can accommodate a substrate 5 in the centre.

The frame part 3 shown in the form of a longitudinal plate in the top of FIG. 1 has at its centre a fixed bearing 6 above which at the upper longitudinal side of the substrate carrier 1 is arranged a guide rail 7, which may have one or more magnets (not shown). By virtue of the fact that the guide rail 7 is spaced apart from the upper frame part 3 by the fixed bearing 6, a gap 8 is created between the guide rail 3 and the substrate carrier 1 or the upper frame part 3. This means that the free ends of the guide rail 7 can move relative to the substrate carrier 1 or the upper frame part 3, without abrasion occurring between the guide rail 7 and the upper frame part 3. In particular, the "soft" design of the upper frame part 3, for example in the form of an aluminum plate, makes it possible for the substrate carrier 1 to twist relative to the guide rail 7, without the possibility of particle abrasion occurring that could lead to a load on the vacuum chamber or interference with electrical or mechanical devices or the coating processes performed therein or the coatings applied therein.

The fixed bearing 6 is shown in more detail in FIGS. 2 to 5.

Figure 2:
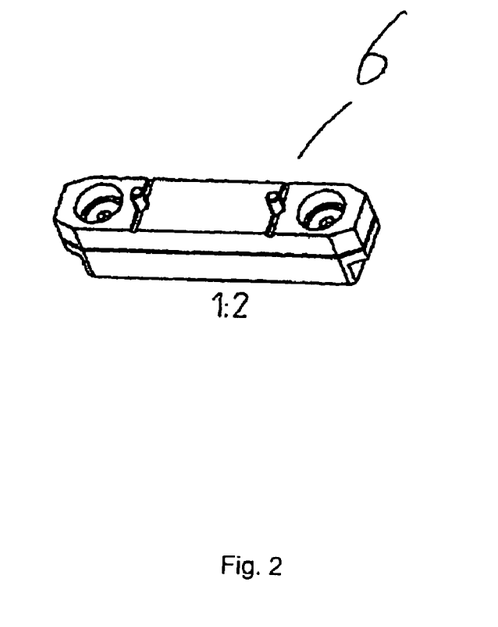
FIG. 2 a three-dimensional view of a bearing of the guide rail of the substrate carrier from FIG. 1.
Figure 3:
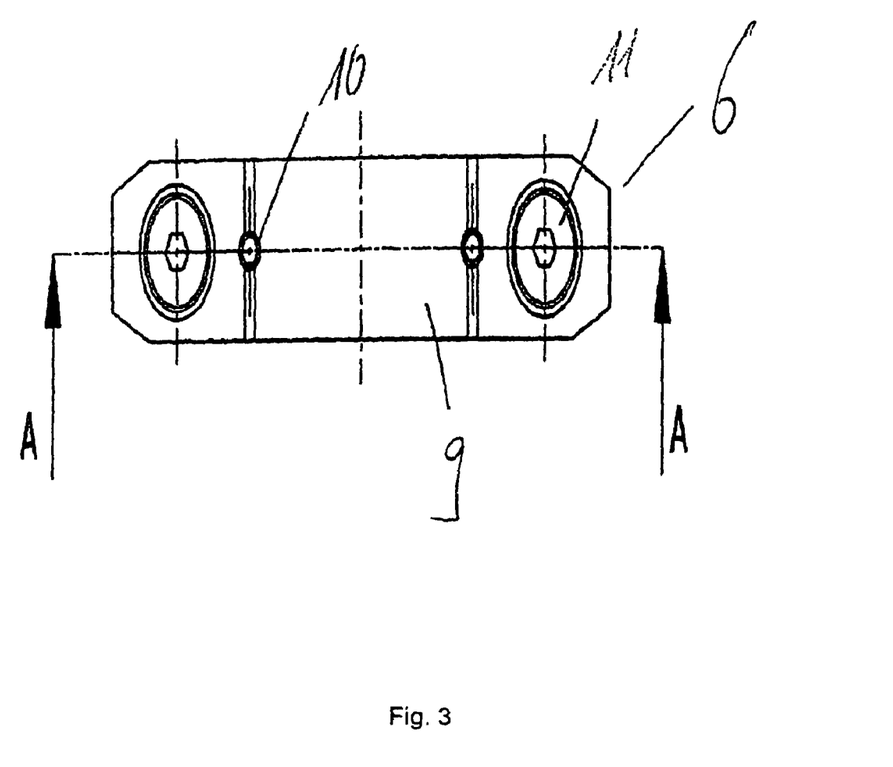
FIG. 3 a plan view of the bearing from FIG. 2.
Figure 4:
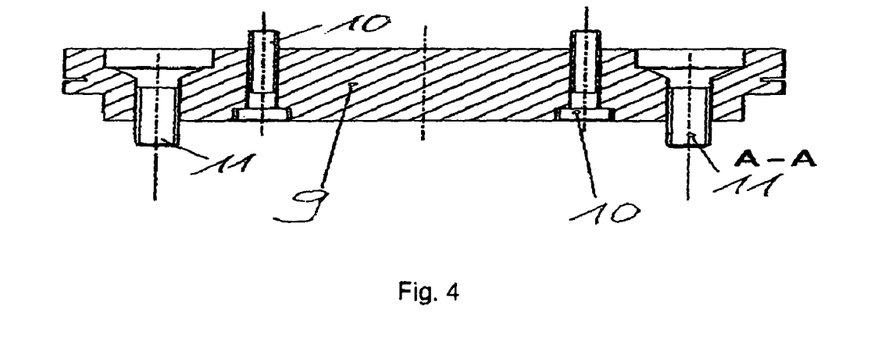
FIG. 4 a cross-sectional view along the cross-section line A-A from FIG. 3.
Figure 5:
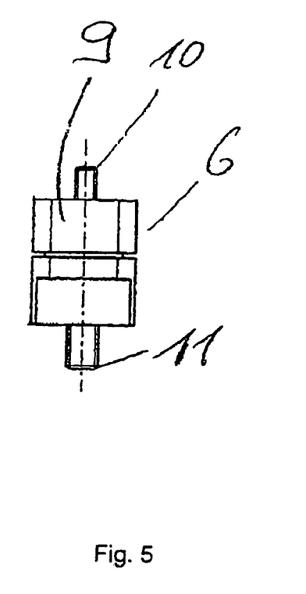
FIG. 5 a side view of the bearing from FIGS. 2 to 4.

FIG. 2 is a three-dimensional illustration of the fixed bearing, whereas FIG. 3 is a plan view and FIG. 4 a cross-sectional view along the cross-section line A-A of FIG. 3. FIG. 5 is a side view of the narrow side of the fixed bearing 6.

As may be seen in FIGS. 2 to 5, the fixed bearing 6 has a bearing body 9 in which are provided bore holes or cutouts for accommodating screws 11 and 10 which may be screwed into the corresponding thread recesses or bore holes of the frame part 3 or the guide rail 7. Consequently, a spaced and, at the same time, fixed and rigid connection can be achieved between the frame part 3 of the substrate carrier 1 and the guide rail 7.

Figure 6:
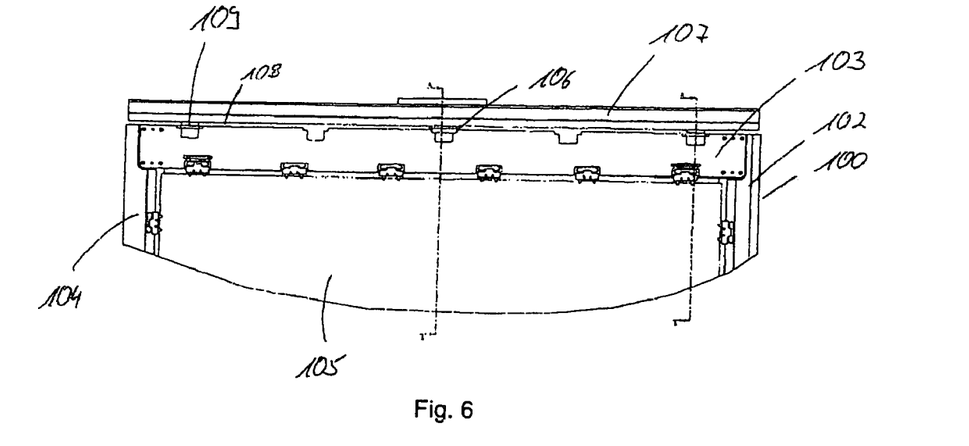
FIG. 6 a partial side view of a further substrate carrier.

FIG. 6 shows a further embodiment of a substrate carrier 100 in accordance with the invention which also is assembled from frame parts 102 to 104 and can accommodate a substrate 105.

The guide rail 107 is in turn connected via a central bearing 106 to the upper frame part 103, with additionally further bearings 109 (side movable bearings) provided at the ends of the guide rail 107. In this embodiment, too, the guide rail 107 is spaced apart from the frame part 103, such that a gap 108 is formed between these parts that largely prevents abrasion in the event of movement by guide rail 107 and frame part 103 towards each other.

Figure 7:
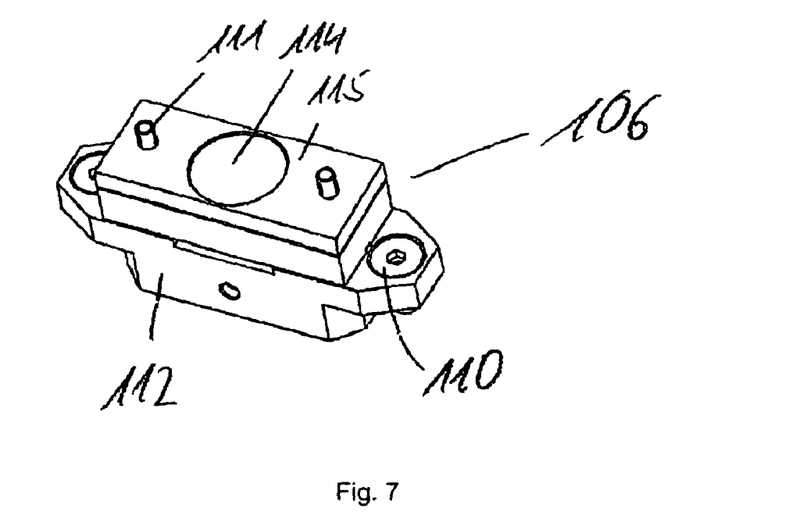
FIG. 7 a three-dimensional view of the pivot bearing of the substrate carrier from FIG. 6.
Figure 8:
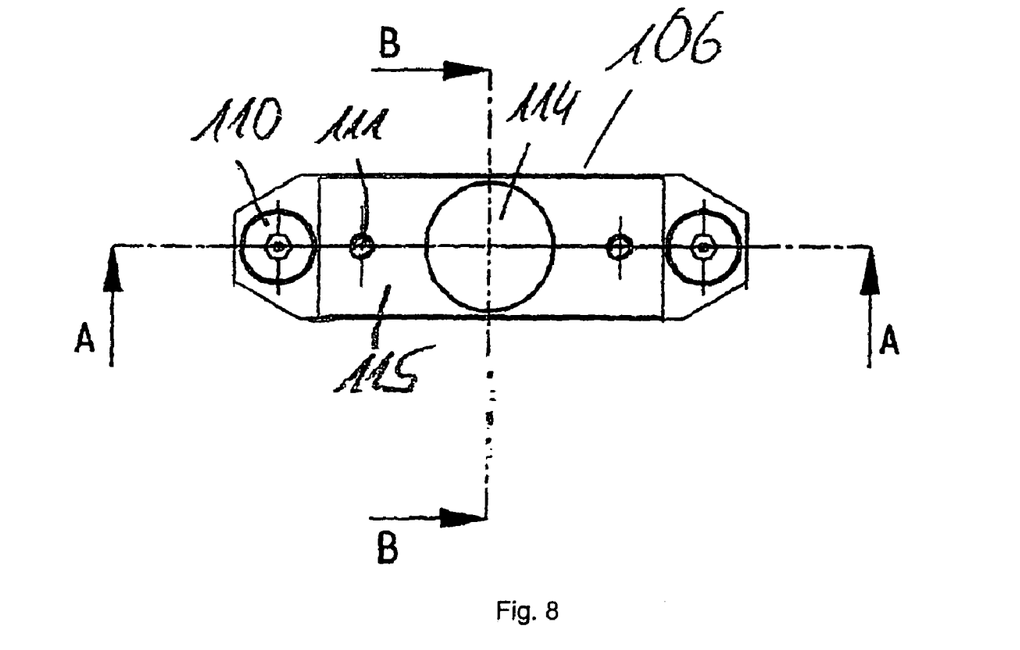
FIG. 8 a plan view of the pivot bearing from FIG. 7.
Figure 9:
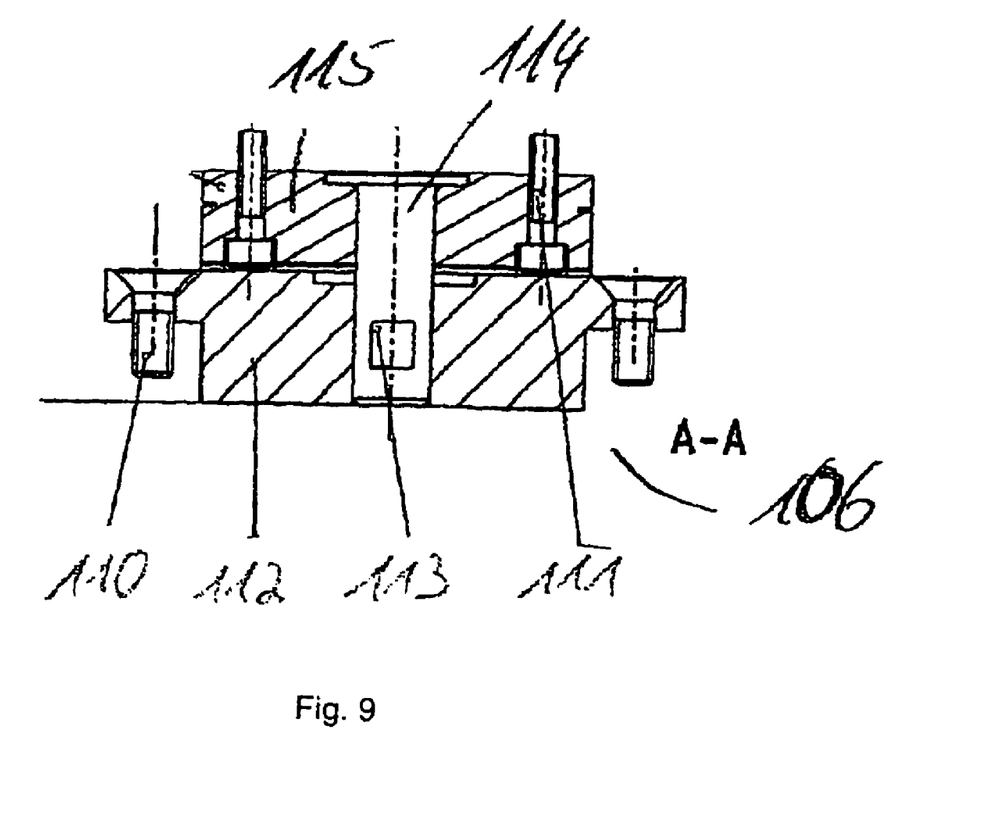
FIG. 9 a cross-sectional view along the cross-section line A-A from FIG. 8.

In the embodiment of the substrate carrier 100, a pivot bearing 106 is provided as a central bearing which has two counter rotatable bearing bodies 112 and 115, as shown in the three-dimensional drawing, plan view and cross-sectional view in FIGS. 7 to 9.

The two rotatable bearing bodies 112 and 115 may, for example, be made from a plastic, with in this case especially a plastic suitable for high-vacuum conditions, such as PEEK plastic, capable of being chosen. A shaft 114, which may be formed for example from stainless steel, is provided for the rotatable connection between the bearing bodies 112 and 115.

The two bearing bodies 112 and 115 are each arranged via screws 110 or 111 at the guide rail 107 or the upper frame part 103 of the substrate carrier 100.

As is especially apparent from FIG. 9, at the shaft 114 can be provided a region 113 which, for example, through interaction with a corresponding transverse lug or a threaded bolt, serves as an axial mounting or lock for the upper bearing part. As for the rest, however, the spaced pivot bearing of the guide rail 107 from the upper frame part 103 facilitates low-friction rotation or twisting of the guide rail 107 relative to the rest of the substrate carrier 100.

As is apparent from FIG. 6, in addition to the axial or central bearing 106 the ends of the guide rail 107 are mounted via roller bearings 109, which facilitate movement of the ends of the guide rail 107 perpendicularly to the plane of the substrate carrier. Correspondingly, the rotation axis of the roller bearing 109 is also arranged parallel with the guide rail 107 or the longitudinal side of the substrate carrier 100.

Figure 10:
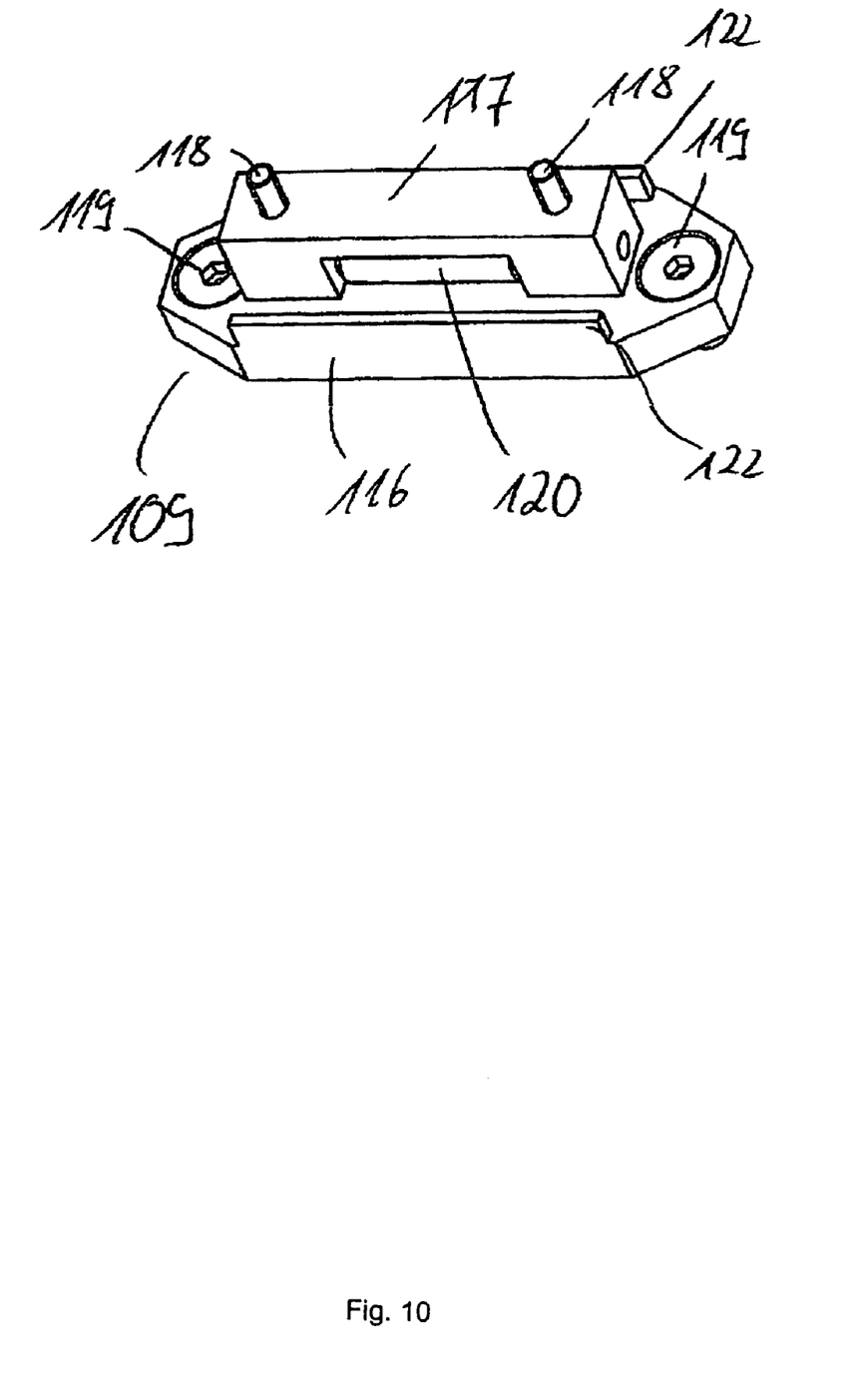
FIG. 10 a three-dimensional view of the roller bearing of the substrate carrier from FIG. 6.
Figure 11:
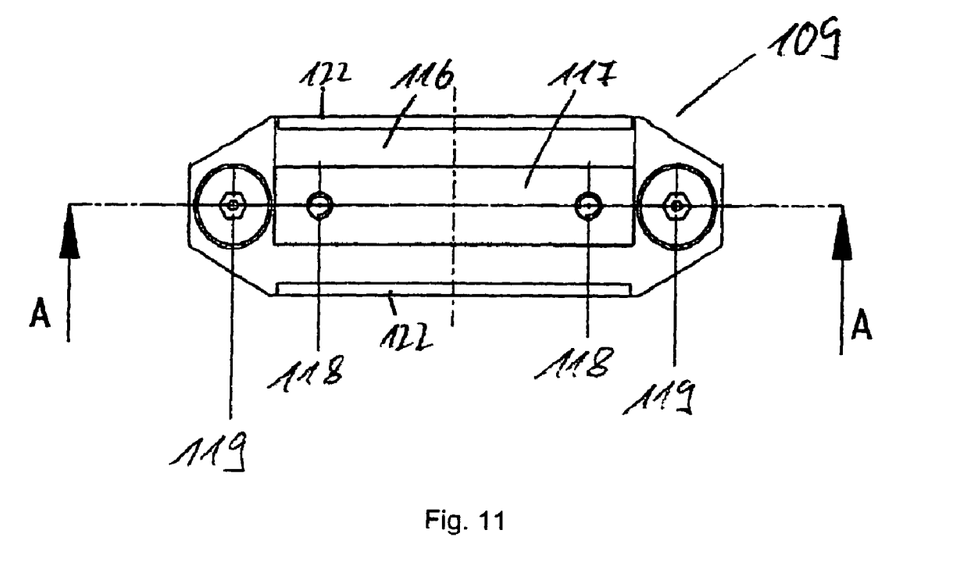
FIG. 11 a plan view of the roller bearing from FIG. 10.
Figure 12:
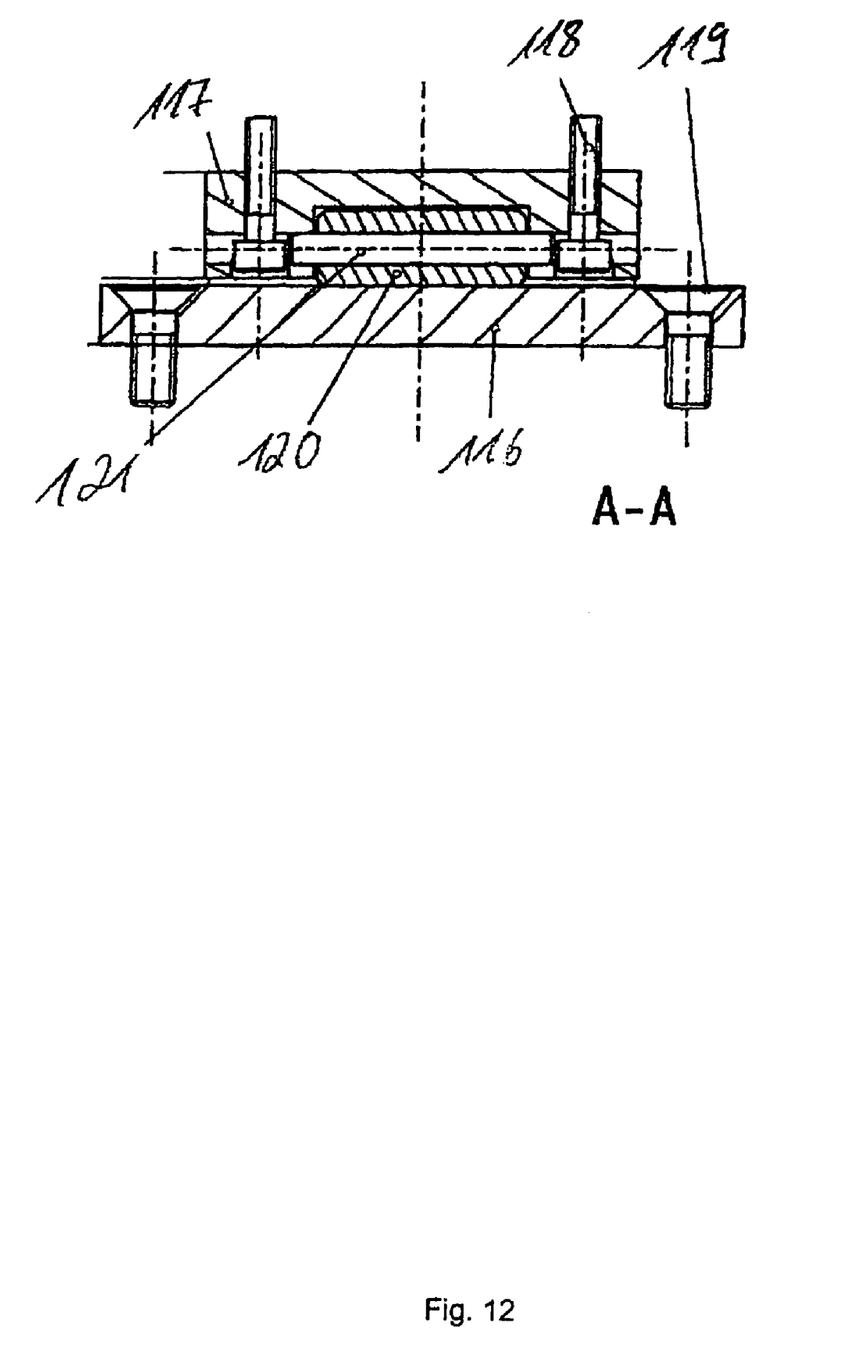
FIG. 12 a cross-sectional view of the roller bearing from FIG. 11 along the cross-section line A-A.
Figure 13:
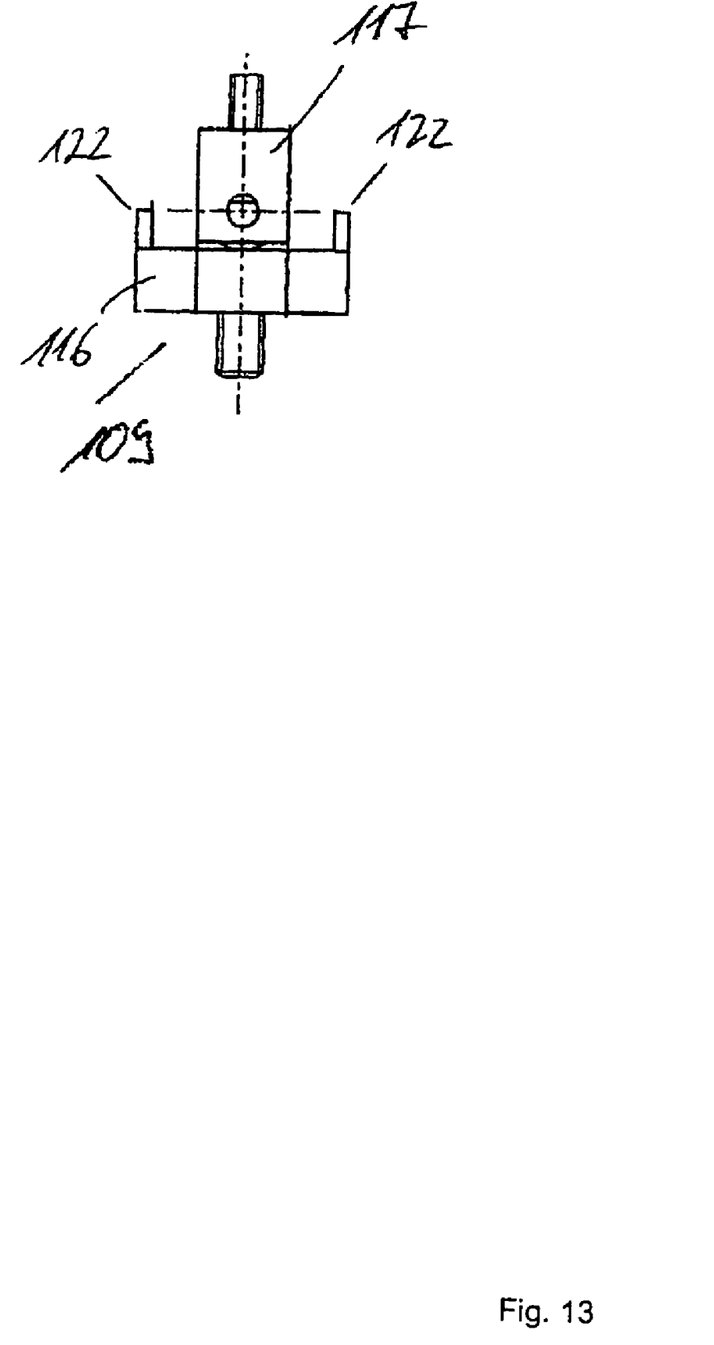
FIG. 13 a side view of the roller bearing from FIGS. 10 to 12.

FIG. 10 is a three-dimensional view of the roller bearing 109, wherein the bearing has two bearing bodies 116 and 117, each of which is connected via screw connections 119 and 118 to the respective components, namely guide rail 107 and upper frame part 103 of the substrate carrier 100. Between the bearing bodies 116 and 117 a rotatable roller 120 is provided which, as is particularly evident from FIG. 12, is rotatable about an axle shaft 121 and thus facilitates a movement of the upper bearing body 117 relative to the lower bearing body 116.

As FIGS. 10 to 13 show, the lower bearing body 116 is wider than the upper bearing body 117, with bars 122 provided along the longitudinal sides at the lower bearing body 116, said bars limiting the movement of the upper bearing body 117.

Instead of a roller bearing, other bearings, such as ball bearings and the like, may be provided.

Figure 14:
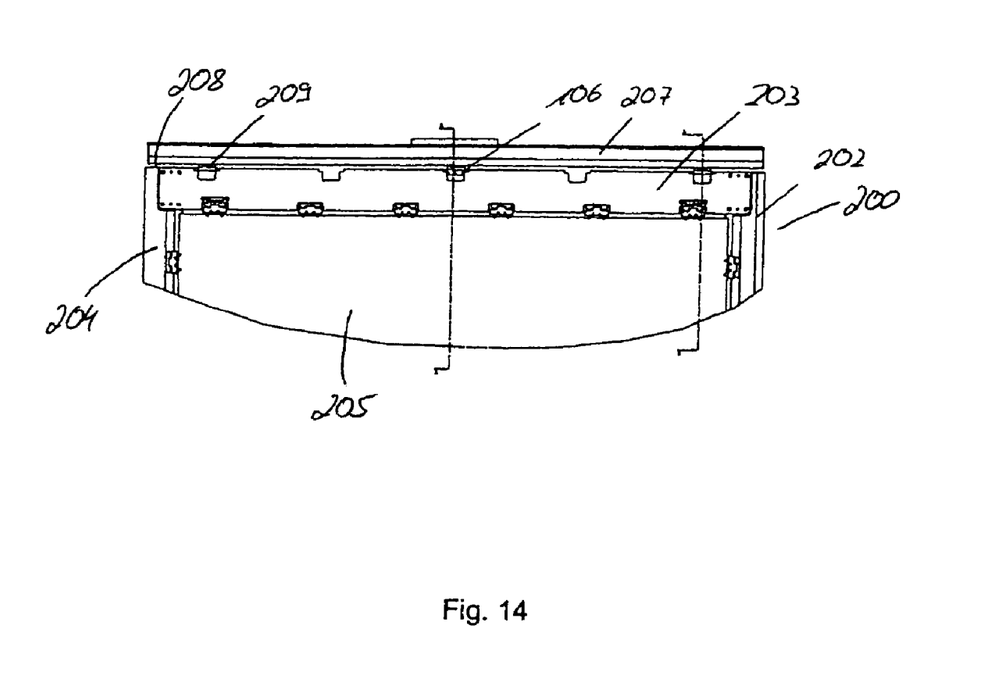
FIG. 14 a partial side view of a further substrate carrier.

FIG. 14 is a partial side view, which is comparable to the views of FIGS. 1 and 6, and shows a third embodiment of a substrate carrier 200 in accordance with the invention, said carrier again being formed by frame parts 202, 203, 204, which between them accommodate substrate 205. In this embodiment, too, a pivot bearing 106 is provided centrally at the upper frame part 203, said bearing being identical with the embodiment of FIG. 6 and facilitating spaced rotatable mounting of the guide rail 207 from the upper frame part 203, such that here again a gap 208 is formed between guide rail 207 and upper frame part 203 of the substrate carrier 200.

Figure 15:
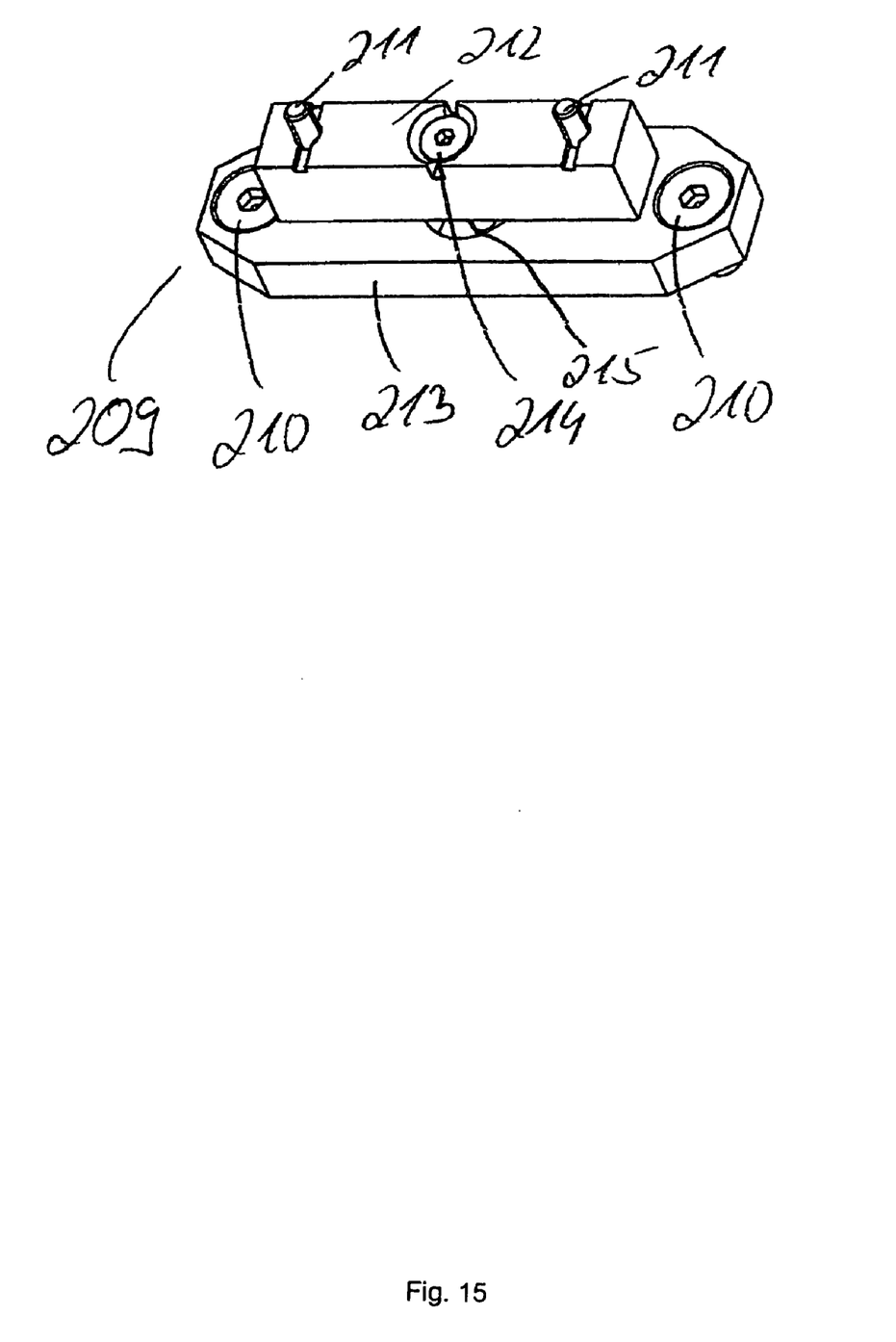
FIG. 15 a three-dimensional view of a movement limiter of the substrate carrier from FIG. 14.
Figure 16:
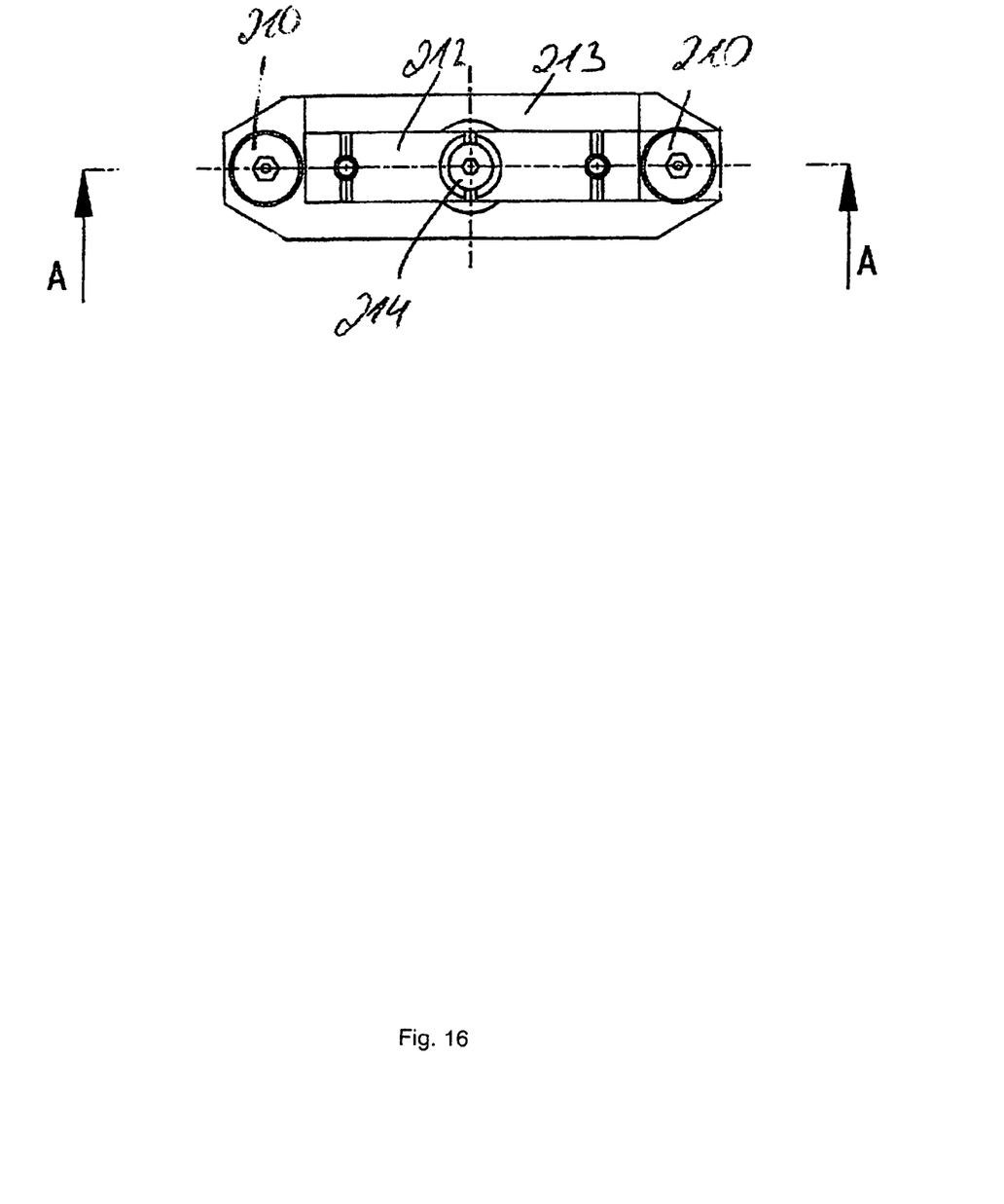
FIG. 16 a plan view of the movement limiter from FIG. 15; and in
FIG. 17 a cross-sectional view of the movement limiter from FIG. 16 along the cross-section line A-A.
Figure 17:
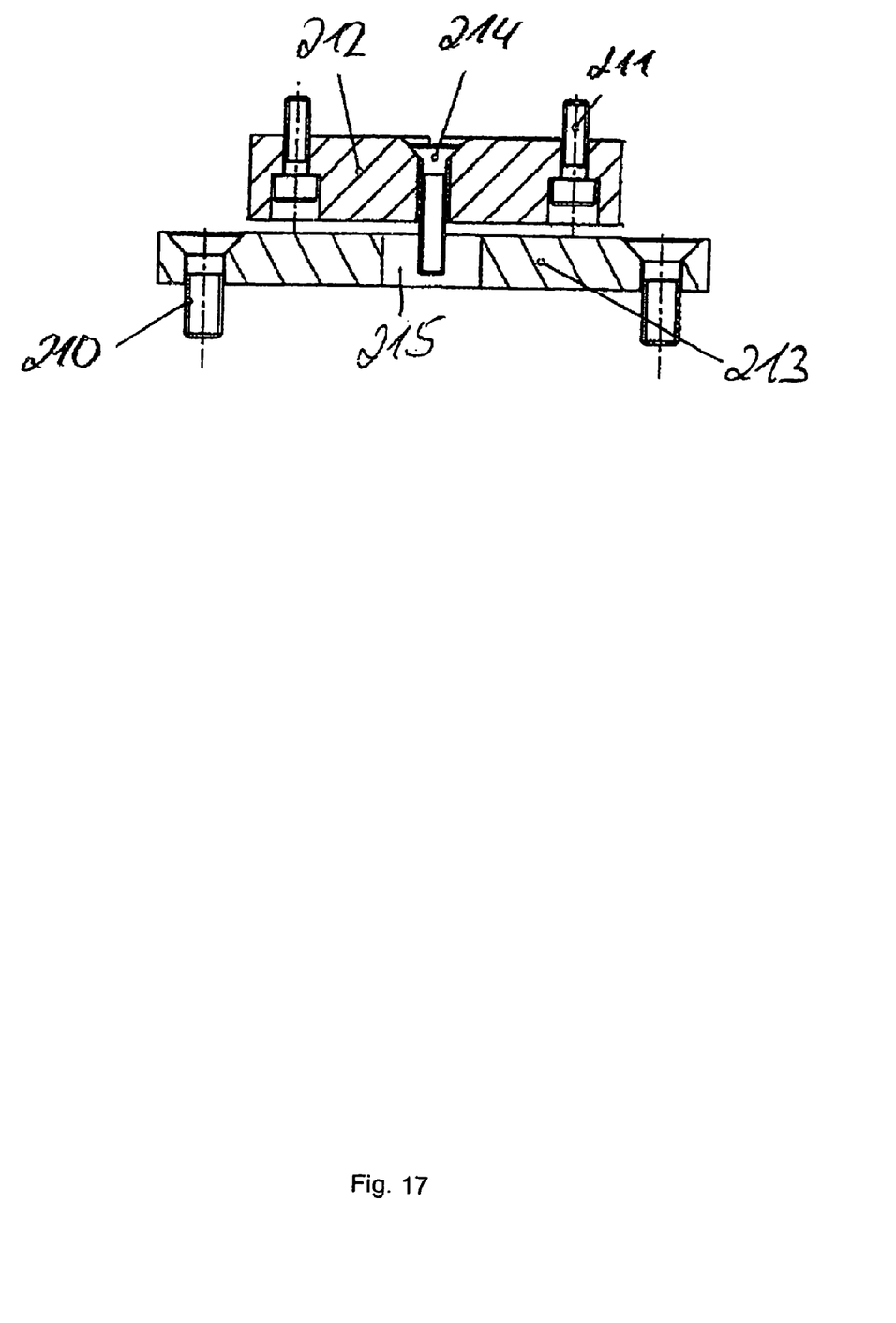

Instead of the roller bearings 109 provided at the ends of the guide rail 107 in the embodiment of the substrate carrier 100, the ends of the guide rail 207 shown in embodiment of the substrate carrier 200 in FIG. 14 are provided with movement limiters 209, which are shown in more detail in FIGS. 15 to 17. FIG. 15 is a three-dimensional diagram of the movement limiter 209, while FIGS. 16 and 17 are a plan view (FIG. 16) and a cross-sectional view along the cross-section A-A line of FIG. 16 (FIG. 17).

The movement limiter 209 has two limiter bodies 212 and 213 spaced apart from each other, each of which is arranged via screw connections 210 and 211 at the guide rail 207 and the upper frame part 203. In the arranged condition at the substrate carrier components, the two movement limiters 212 and 213 form between them a gap such that contact-free movement of the limiter bodies 212 and 213 towards each other is possible.

In the limiter body 213, as is especially evident from FIG. 17, a cylindrical cutout 215 is provided into which, through the upper limiter body 212, a screw 214 with its threaded pin projects. Instead of such a screw construction, another screw design, such as an integral screw design, may be provided at the limiter body 212 or the provision of a corresponding bolt or the like may be considered. The essential aspect is that the screw pin is merely restricted in its freedom of movement by the cutout 215, such that the screw 214 strikes the lower limiter body 213 after a certain degree of movement and thus limits mutual movement of guide rail 207 and upper frame part 203.

The invention claimed is:

1. Device for transporting substrates through vacuum chambers, comprising:
   a substrate carrier, on or at which can be arranged the substrate,
   a guide rail provided at the substrate carrier and extending at least along one side of the substrate carrier, wherein the guide rail is arranged at the substrate carrier such that it is held by one or more bearings spaced apart from the substrate carrier and kept at a distance from the substrate carrier; and
   a magnetic holding system guiding the guide rail along a transport path, wherein the magnetic holding system does not contact the guide rail.

2. Device in accordance with claim 1, wherein that the guide rail is arranged along a longitudinal side in the longitudinal direction.

3. Device in accordance with claim 1, wherein the substrate carrier has a flat surface on or at which large-surface, flat substrates are attachable.

4. Device in accordance with claim 1, wherein the guide rail is mounted at the center or in a central region at the substrate carrier.

5. Device in accordance with claim 1, wherein the one or just a few spaced bearings comprises a fixed or movable bearing.

6. Device in accordance with claim 5, wherein the one or just a few spaced bearings comprises a pivot bearing having a rotation axis arranged in at least one of a plane of the substrate carrier or essentially perpendicularly to the side of the substrate carrier.

7. Device in accordance with claim 5,wherein the at least one or just a few spaced bearings comprises a pivot bearing, the pivot bearing comprising at least one of at least one rotatable plastic bearing block or a shaft.

8. Device in accordance with claim 5, wherein the fixed bearing is realized by at least one of screw connections or an intermediate block.

9. Device in accordance with claim 1, wherein the one or just a few spaced bearings consists of an axial or central bearing.

10. Device in accordance with claim 1, wherein the one or just a few spaced bearings comprises an axial or central bearing and one or more side bearings.

11. Device in accordance with claim 10, wherein the movable bearings comprise a ball or roller bearing having a rotation axis parallel to a longitudinal side of the substrate carrier.

12. Device in accordance with claim 10, wherein the substrate carrier at the side at which the guide rail is arranged has an elastic material which especially acts with the axial or central fixed bearing like a leaf spring.

13. Device in accordance with claim 1, wherein at least one of the guide rail or substrate carrier has a rotation or movement limiter which limits mutual movement of the ends of the guide rail relative to the substrate carrier.

14. Device in accordance with claim 13, wherein the rotation or movement limiter is designed as a separate part or is integrated into a bearing.

15. Device in accordance with claim 13, wherein the rotation or movement limiter comprises a pin which is arranged at the substrate carrier or the guide rail and a body with a cutout or a cavity, which is provided opposite the pin and surrounding this at the guide rail or the substrate carrier, such that the pin can execute a limited movement in the cutout or the cavity.

16. Device in accordance with claim 13, wherein the rotation or movement limiter is formed by two elements limiting movement of a bearing part.

17. Device in accordance with claim 1, wherein the guide rail is a magnet or comprises one or more magnets.

18. Device in accordance with claim 7 wherein the at least one rotatable plastic bearing block comprises two rotatable plastic bearing blocks.

19. Device in accordance with claim 7 wherein the at least one rotatable plastic bearing block comprises a PEEK block.

20. Device in accordance with claim 7 wherein the shaft comprises a stainless steel shaft.

21. Device in accordance with claim 10, wherein the one or more side bearings comprise movable bearings.

22. Device in accordance with claim 11, wherein the ball or roller bearing acts in connection with the axial or central bearing.

* * * * *